(12) United States Patent
Radun

(10) Patent No.: US 8,058,749 B2
(45) Date of Patent: Nov. 15, 2011

(54) SYSTEM AND METHOD FOR TRANSFERRING POWER BETWEEN AN AIRCRAFT POWER SYSTEM AND ENERGY STORAGE DEVICES

(75) Inventor: Arthur Vorwerk Radun, Mason, OH (US)

(73) Assignee: GE Aviation Systems, LLC, Dayton, OH (US)

( * ) Notice: Subject to any disclaimer, the term of this patent is extended or adjusted under 35 U.S.C. 154(b) by 330 days.

(21) Appl. No.: 12/433,782

(22) Filed: Apr. 30, 2009

(65) Prior Publication Data

US 2010/0276992 A1 Nov. 4, 2010

(51) Int. Cl.
*H02J 9/08* (2006.01)
(52) U.S. Cl. ......................................... 307/64
(58) Field of Classification Search .............. 307/64–66, 307/9.1
See application file for complete search history.

(56) References Cited

U.S. PATENT DOCUMENTS

| 5,191,229 | A | * | 3/1993 | Davis et al. | 307/66 |
| 5,844,329 | A | * | 12/1998 | Bailey et al. | 307/66 |
| 5,998,960 | A | | 12/1999 | Yamada et al. | |
| 6,459,175 | B1 | | 10/2002 | Potega | |
| 6,624,533 | B1 | * | 9/2003 | Swanson et al. | 307/64 |
| 7,112,944 | B1 | | 9/2006 | Kojori | |
| 7,569,949 | B2 | * | 8/2009 | Lathrop et al. | 307/64 |
| 7,759,821 | B2 | * | 7/2010 | Lando et al. | 307/66 |
| 7,821,159 | B2 | * | 10/2010 | Day | 307/65 |
| 2008/0100135 | A1 | | 5/2008 | Lazarovich et al. | |
| 2008/0174177 | A1 | | 7/2008 | Langlois et al. | |
| 2008/0285314 | A1 | | 11/2008 | Kojori | |

FOREIGN PATENT DOCUMENTS

| DE | 10252292 A1 | 6/2004 |
| EP | 1919065 A2 | 5/2008 |
| EP | 2040361 A1 | 3/2009 |
| WO | 2007015146 A2 | 2/2007 |

OTHER PUBLICATIONS

PCT/US2010/027094, Search Report and Written Opinion, Jul. 2, 2010.

* cited by examiner

*Primary Examiner* — Albert W Paladini
(74) *Attorney, Agent, or Firm* — David J. Clement, Esq.; Armstrong Teasdale LLP

(57) ABSTRACT

A method for transferring power in an aircraft between an energy storage device and a power system. The method includes determining an amount of power required by the power system, determining a predetermined amount of power from a generator, comparing the power required by the power system to the predetermined power of the generator, and transferring power to the energy storage device from the power system or to the power system from the energy storage device based on the comparing.

20 Claims, 6 Drawing Sheets

SYSTEM AND METHOD FOR TRANSFERRING POWER BETWEEN AN AIRCRAFT POWER SYSTEM AND ENERGY STORAGE DEVICES

BACKGROUND OF THE INVENTION

This invention relates generally to transferring electrical power in an aircraft, more particularly to transferring power between an energy storage device in an electrical accumulator unit (EAU) and an electrical power system Conventional aircraft power systems that provide power to electrical aircraft loads can suffer from a variety of deficiencies. For example, conventional aircraft power systems require the use of generators to produce power for an aircraft. These generators may be required to supply a very large amount of power over a short duration during a spike when a large surge of power is needed. For example, on average, an aircraft power system may draw about 60 kilowatts of power from a generator, but there may be times when the power system requires 130 kilowatts of power from the generator for a short period of time. Therefore, in order for a generator to be able to handle this large spike in power needed, conventional power systems require generators with a high rating. Unfortunately, generators with a high rating are not only more expensive than lower rated generators, they are also larger and heavier.

Some of the latest aircraft power systems also include electrical actuator loads for moving, for example, a surface of a plane such as a rudder. The use of electrical actuators on aircraft is expected to become more and more common in future aircraft designs. When an actuator motor is instructed to stop, the motor is de-accelerated. The de-acceleration of an actuator generates kinetic energy which is converted to electrical energy by the actuator and placed back onto the power system and therefore back to a generator. The resulting electrical power from this recovered kinetic energy is called regenerated power. Thus, because a generator cannot absorb this power, resisters are utilized to dissipate the kinetic energy that is returned from the actuator after de-acceleration. This creates heat, and because this heat is not utilized, the heat created by the resisters may cause problems with a cooling system on an aircraft.

Conventional aircraft power systems also include two battery supplies. One battery (e.g., a primary battery) acting as a primary energy storage device to an engine controller and a secondary battery acting as a backup to the primary battery. Thus, in an event of a failure or drainage of the primary battery, an engine controller draws power from the secondary battery to continue operation. However, the use of two batteries as part of a redundant system not only increases the overall weight of an aircraft, but can reduce the ability of the aircraft to carry additional payload.

BRIEF DESCRIPTION OF THE INVENTION

In one aspect, a method for transferring power in an aircraft between an energy storage device and a power system is provided. The method includes determining an amount of power required by the power system, determining a predetermined amount of power from a generator, comparing the power required by the power system to the predetermined power of the generator, and transferring power to the energy storage device from the power system or to the power system from the energy storage device based on the comparing.

In another aspect, an aircraft power system configured to transfer power between one or more energy storage devices and a power system is provided. The system includes a processor programmed to determine an amount of power required by the power system, determine a predetermined power from a generator, compare the power required by the power system to the predetermined power of the generator, and transfer power to at least one of the one or more energy storage devices from the power system or to the power system from the at least one of the one or more energy storage devices based on the comparing.

In a further aspect, an electric accumulator unit (EAU) configured to transfer power between one or more energy storage devices and a power system is provided. The EAU includes the one or more energy storage devices, and a computing device. The computing device includes a determining component for determining an amount of power required by the power system and an amount of power available from the one or more energy storage devices, a comparing component for comparing the power required by the power system to the power available from at least one of the one or more energy storage devices, and an energy transfer converter for transferring power to the at least one of the one or more energy storage devices from the power system or for transferring power to the power system from the at least one of the one or more energy storage devices based on the comparing.

DETAILED DESCRIPTION OF THE INVENTION

Figure 1:
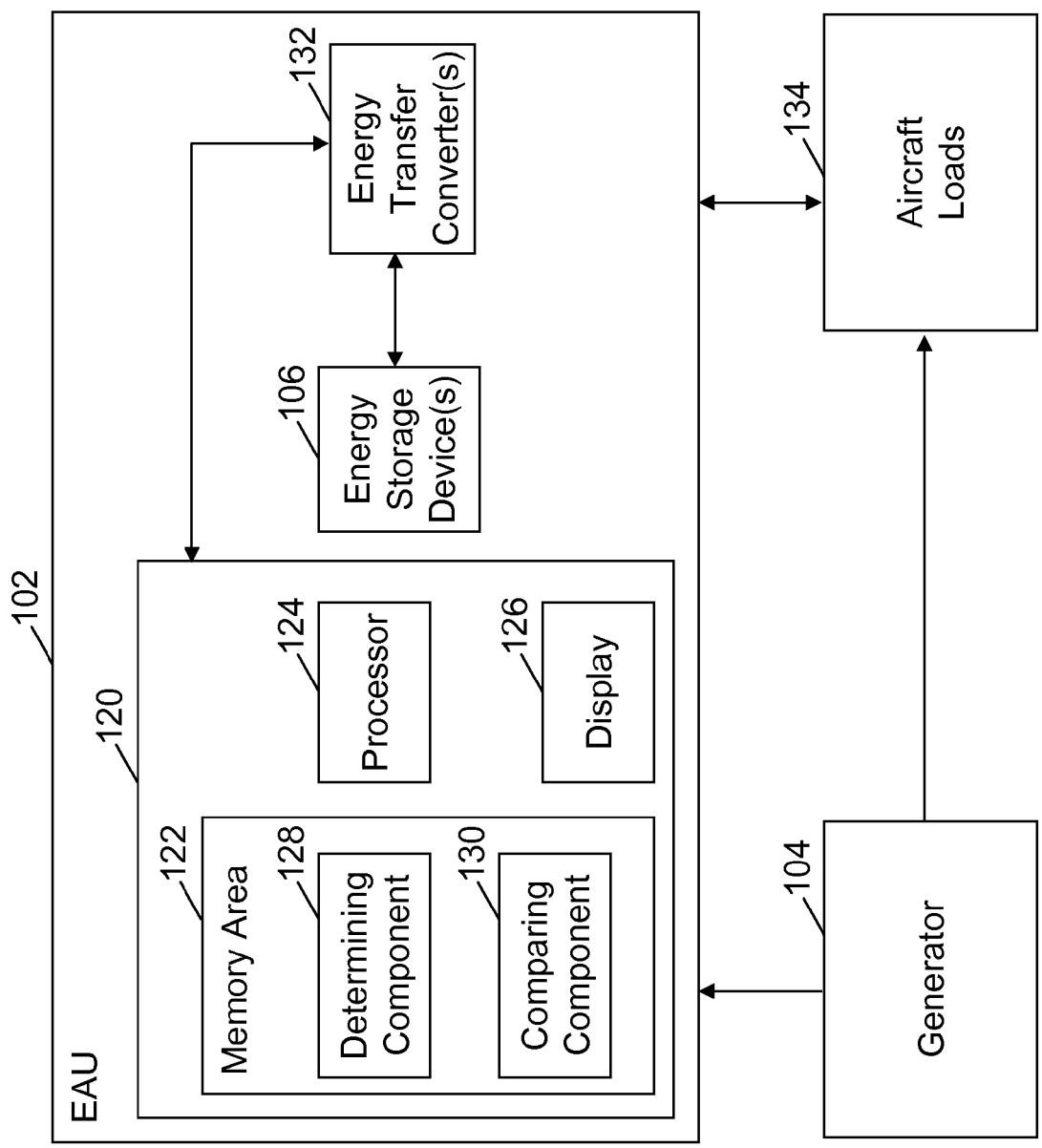
FIG. 1 is a block diagram of an aircraft power system.

FIG. 1 is a block diagram of an aircraft power system 100. System 100 includes an electrical accumulator unit (EAU) 102, that includes, for example, multiple energy sources, multiple energy transfer converters that supplies system 100 supplemental power to reduce a peak amount of power required from a generator 104. Thus, because EAU 102 provides supplemental power, the peak required amount of power from generator 104 is reduced to a value closer to an average aircraft power load 134, for example, 60 kilowatts.

In one embodiment, EAU 102 employs one or more energy storage devices 106 to absorb and/or supply power during power fluctuations. One or more energy storage devices 106 are able to absorb kinetic energy returned from actuators after de-acceleration so this energy does not have to be dissipated in resistors. Therefore, unlike conventional aircraft power systems with loads that release kinetic energy and do not utilize the kinetic energy, EAU 102 captures kinetic energy and stores the kinetic energy in one or more energy storage devices 106 to be used at a later time. In embodiments, EAU 102 enables an optimum combination of energy storage technologies, for example, a battery, a capacitor, a super capacitor, or a fly wheel, to be employed to provide a maximum amount of energy to be extracted from and/or absorbed by one or more energy storage devices 106. Further, because EAU 102 may include a combination of energy storage devices, EAU 102 can utilize the different advantages the different energy storage technologies have. For example, batteries store large amounts of energy and their internal voltage is relatively constant during a charge or discharge and batteries have relatively large internal resistance, especially at cold temperatures. Capacitors are much lighter than batteries and may release a greater amount of energy in a given time compared to a battery. However, capacitors store less energy than a battery and unlike a battery, a capacitor's voltage changes significantly while they charge or discharge. Thus, in embodiments described herein, it may be desirable to combine the best features of these two energy storage technologies when considering factors such as temperature, altitude, resistance, power storage capacity, weight, size, and an amount of power needed to be supplied over time or at a given moment during a spike.

With reference back to FIG. 1, system 100 further includes a computing device 120 communicatively coupled to or within EAU 102. Computing device 120 includes a memory area 122, at least one processor 124, an energy transfer converter 132, and a display 126 for displaying power levels to a user. Although processor 124 is shown separate from the memory area 122, embodiments of the invention contemplate that memory area 122 may be onboard processor 124, such as in some embedded systems. In an embodiment, computing device 120 controls energy transfer converter 132 which in turn controls a power flow between energy storage devices within EAU 102 and the aircraft power system 100. Computing device 120 is merely illustrative of an exemplary computing device that can be used in connection with one or more embodiments of the invention, and is not intended to be limiting in any way. Further, peripherals or components of the computing device 120 known in the art are not shown, but are operable with aspects of the invention are contemplated.

Memory area 122, or other computer-readable media, stores computer-executable components for determining, comparing, and transferring power. Exemplary components include, but are not limited to a determining component 128 and a comparing component 130.

Determining component 128 is configured to determine an amount of power (e.g., current) required by a power system, and a predetermined power of the generator 104, which is typically an average load power computed for a chosen averaging period plus a power needed to maintain an average state of charge of energy storage devices. Comparing component 130 is configured to compare the power required by the power system to the predetermined power of the generator. Energy transfer converter 132 is configured to transfer power to the at least one of the one or more energy storage devices from the power system or transfer power to the power system from the at least one of the one or more energy storage devices based on the comparing.

In embodiments, processor 124 is transformed into a special purpose microprocessor by executing computer-executable instructions or by otherwise being programmed. For example, the processor 124 is programmed with instructions such as is illustrated in FIG. 2.

Figure 2:
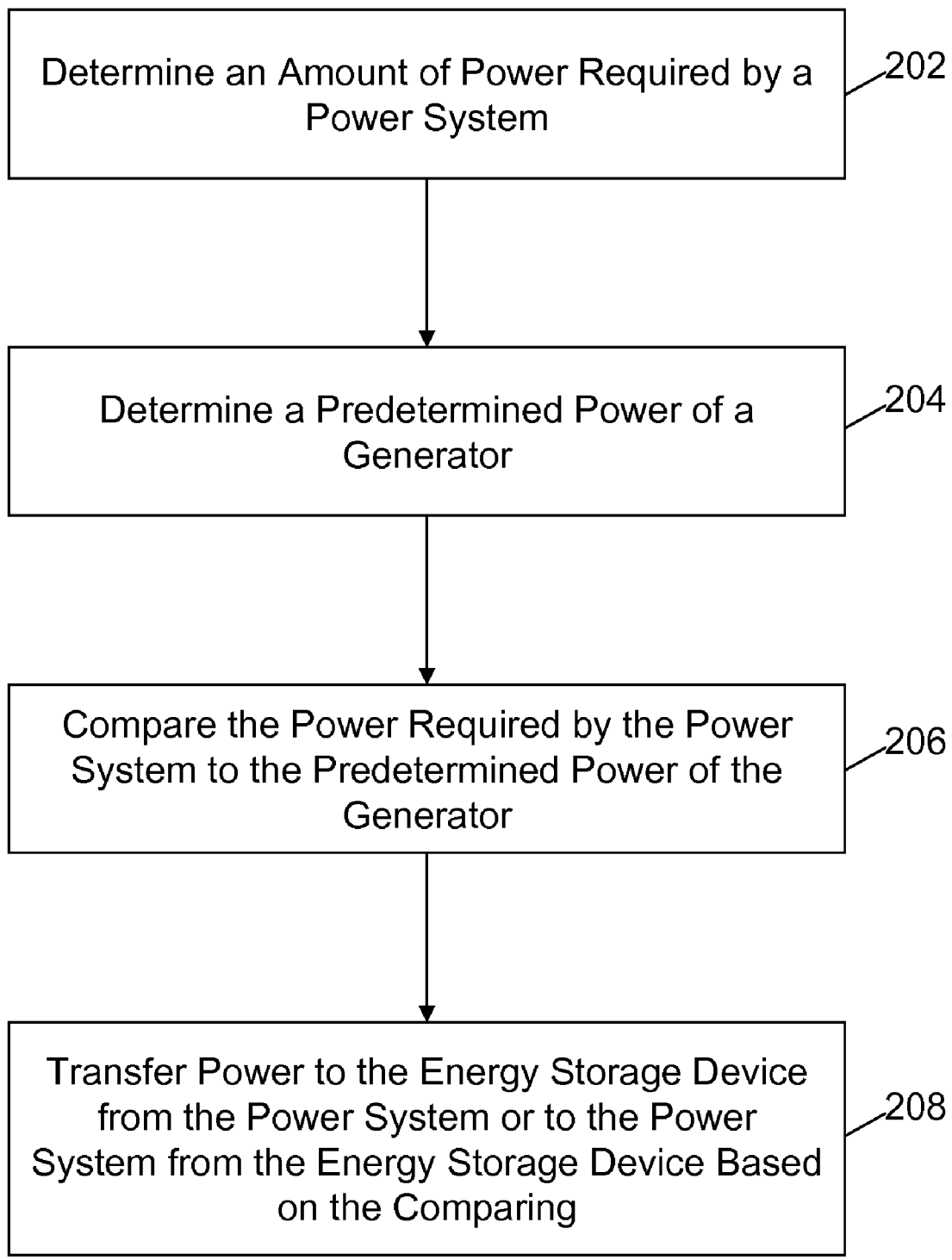
FIG. 2 is a flow diagram of an exemplary method for transferring power between an energy storage device and a power system.

With reference now to FIG. 2, a flow diagram of an exemplary method 200 for transferring power between an energy storage device and a power system is shown. At 202, an amount of power (e.g., current) required by power system loads, for example, actuator loads, is determined. At 204 the predetermined power from a generator is determined. In embodiments, an energy storage device is for example, a battery, a capacitor, a super capacitor, or a fly wheel. At 206, the power required by the power system is compared to the predetermined power of the generator. At 208, power is transferred to the energy storage device from the power system or to the power system from the energy storage device based on the comparing. For example, as explained in detail below with respect to FIGS. 3-5, when the predetermined power of the generator is less than the power required by the power system, power is transferred from the energy storage device to the power system. In contrast, if the predetermined power of the generator is greater than the power required by the power system, power is transferred from the power system to the energy storage device.

Figure 3:
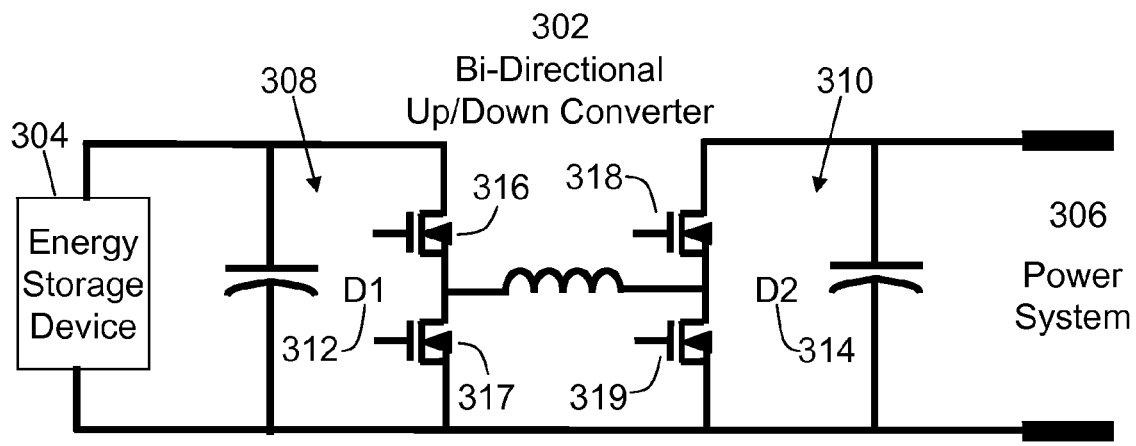
FIGS. 3-5 are schematic illustrations of a bidirectional up/down converter electrical accumulator unit.

With reference now to FIG. 3, a schematic illustration of a bidirectional up/down converter EAU 302 is shown. Bidiredctional up/down converter EAU 302 is configured to send power to and from an energy storage device 304 and a power system 306. For example, if energy storage device 304 contains a higher voltage than power system 306, energy storage device 304 can send power system 306 power by virtue of bidirectional up/down converter EAU 302. Additionally, if power system 306 contains a voltage higher than energy storage device 304, power system 306 can send energy storage device 304 power. In embodiments, power system 306 is a 270 Vdc power system characteristic of a latest military aircraft (for example a F-35). In further embodiments, bidirectional up/down converter EAU 302 includes phase legs 308 and 310, and duty cycles 312 and 314 that correspond to phase legs 308 and 310, respectively. Duty cycles 312 and 314 are used to control an amount of power that is provided to and from energy storage device 304 and power system 306 by defining a length of time that an upper switch, for example, upper switch 316 or upper switch 318, is on/closed compared to a length of time the upper switch is turned off/open. In an embodiment, when upper switch 316 is on/closed its corresponding lower switch 317 is off/open and when upper switch 316 is off/open its corresponding lower switch 317 is on/closed. Similarly, when upper switch 318 is on/closed its corresponding lower switch 319 is off/open and when upper switch 318 is off/open its corresponding lower switch 319 is on/closed.

Therefore, to provide power system 306 enough power to supplement a generator's power during a spike in power needed by aircraft loads, duty cycles 312 and 314 are determined to define a length of time that a particular upper switch is on/closed and a corresponding lower switch is off/open.

Figure 4:
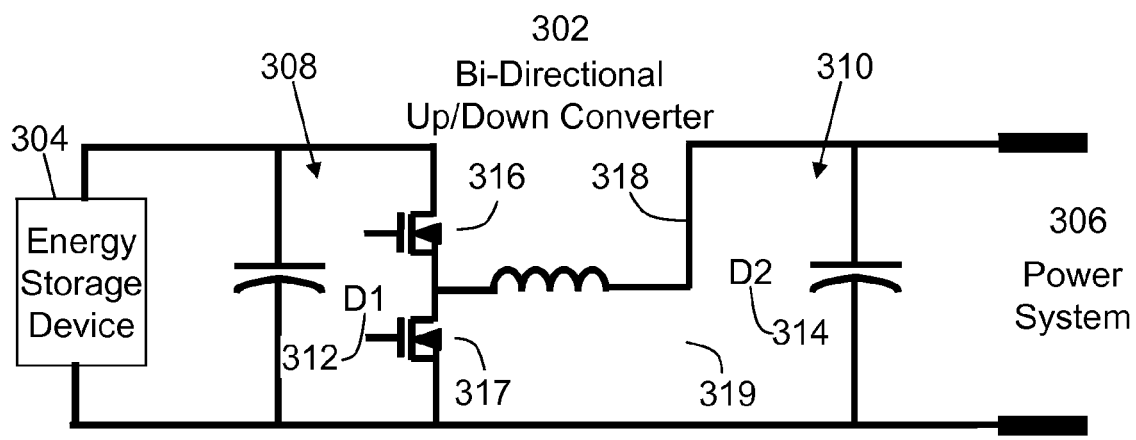

For example, with reference now to FIG. 4, a schematic illustration of bidirectional up/down converter EAU 302 transferring power to and from energy storage device 304 to power system 306, when an energy storage device voltage is greater than a power system voltage, is shown. When the voltage of energy storage device 304 is greater than the voltage of power system 306, duty cycle 314 instructs upper switch 318 to be on/closed and (which automatically opens its corresponding lower switch), thus allowing a transfer of power between energy storage device 404 and power system 306 under the control of duty cycle 312. In embodiments, phase leg 308 is pulse width modulated to control bidirectional power flow between energy storage device 304 and power system 306 to maintain a computed predetermined generator current.

Figure 5:
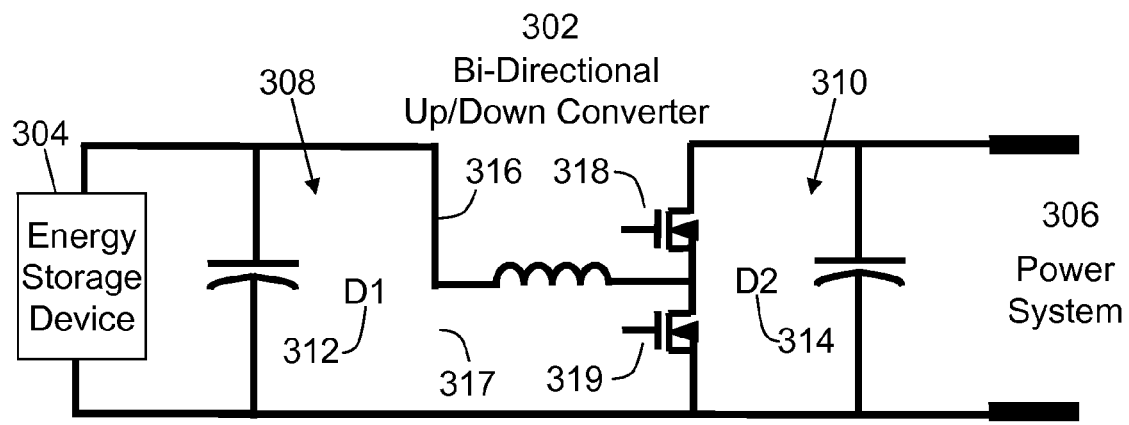

With reference now to FIG. 5, a schematic illustration of bidirectional up/down converter EAU 302 transferring power to and from power system 306 to energy storage device 304 when the energy storage device voltage is less than the power system voltage is shown. When the voltage of energy storage device 304 is less than the voltage of power system 306, duty cycle 312 instructs upper switch 316 to be on/closed thus allowing a transfer of power between power system 306 and energy storage device 304 under the control of duty cycle 314. In embodiments, upper switch 316 is turned on/closed when duty cycle 312 has a value of "1", and remains off/open when duty cycle 312 has a value of "0". In embodiments, phase leg 310 is pulse width modulated to control bidirectional power flow between power system 306 and energy storage device 304 to maintain a computed predetermined generator current.

The bidirectional up/down converter in an EAU described herein does not require a transformer which adds size and weight to an aircraft. Further, only one phase leg is pulse width modulated at a time reducing switching losses. The up/down capability allows maximum energy extraction and/or absorption to be achieved without having very large voltages and allows the for either an energy storage device voltage to be greater than or less than the power system voltage. Further two phase legs provide redundancy for fault protection.

Figure 6:
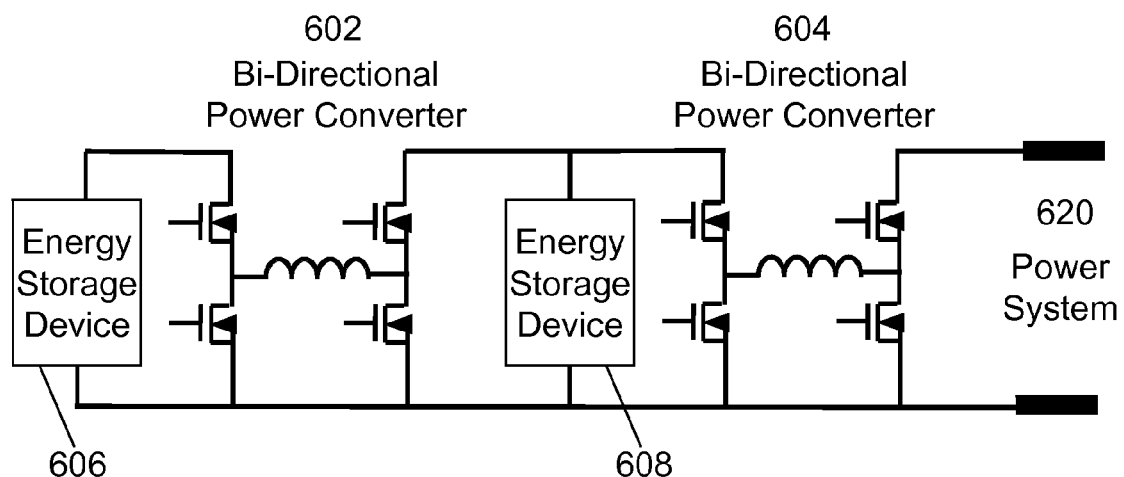
FIG. 6 is a schematic illustration of a series connection of a first energy storage device and a second energy storage device within two bidirectional up/down converters.

With reference now to FIG. 6, a schematic illustration of a first energy storage device 606 and a second energy storage device 608 connected in series within two bidirectional up/down converters 602 and 604, respectively, to create an EAU is shown. As shown in FIG. 6, bidirectional up/down power converters 602 and 604 interface a second energy storage device 608 to power system 610. The bidirectional power converters enable second energy storage device 608 to supply power to power system 610 or absorb power from power system 610 when a voltage of energy storage device 608 changes due to a change in energy. If a voltage of second energy storage device 608 changes beyond a predetermined range, first storage device 606 supplies power to or removes power from second energy storage device 608 through bidirectional up/down converter 602.

Figure 7:
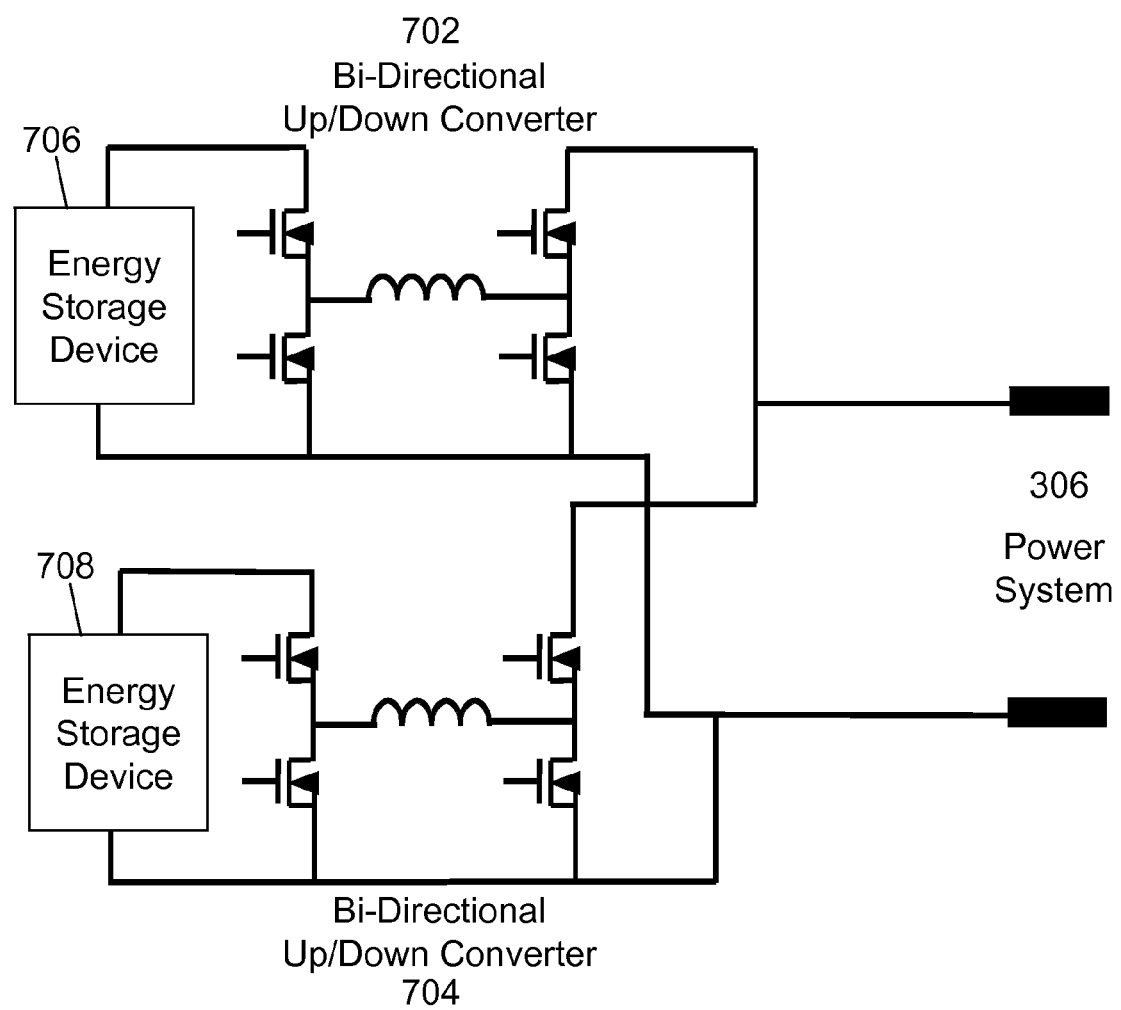
FIG. 7 is a schematic illustration of a parallel connection of energy storage devices within two bidirectional up/down converters.

Referring now to FIG. 7, a schematic illustration of a parallel connection of energy storage devices 706 and 708 within bidirectional up/down converters 702 and 704, respectively, to create an EAU is shown. As shown in FIG. 7, bidirectional up/down converters 702 and 704 include a parallel connection of energy storage devices 706 and 708. In embodiments, energy storage devices 706 and 708 are one of the following, a battery, a capacitor, a super capacitor, a fly wheel, or combination thereof. A parallel connection as shown in FIG. 7 provides an EAU wherein a sum of power ratings of bidirectional up/down converters 702 and 704 may equal a peak EAU power rating, in contrast to a single bidirectional up/down converter in a series which individually must equal the peak EAU power rating. Thus, unlike an EAU that only includes one energy storage device, energy storage devices 706 and 708 can be chosen for their best features and operated over their best time scales to optimize the EAU's performance. In addition, the energy storage devices 706 and 708 are not in parallel with the corresponding limitation each energy storage device would impose on the other energy storage device. For example, a relatively constant battery voltage may prevent significant energy from being exchanged with a capacitor in parallel with the battery because a capacitor's voltage must change in order for its stored energy to change.

Figure 8:
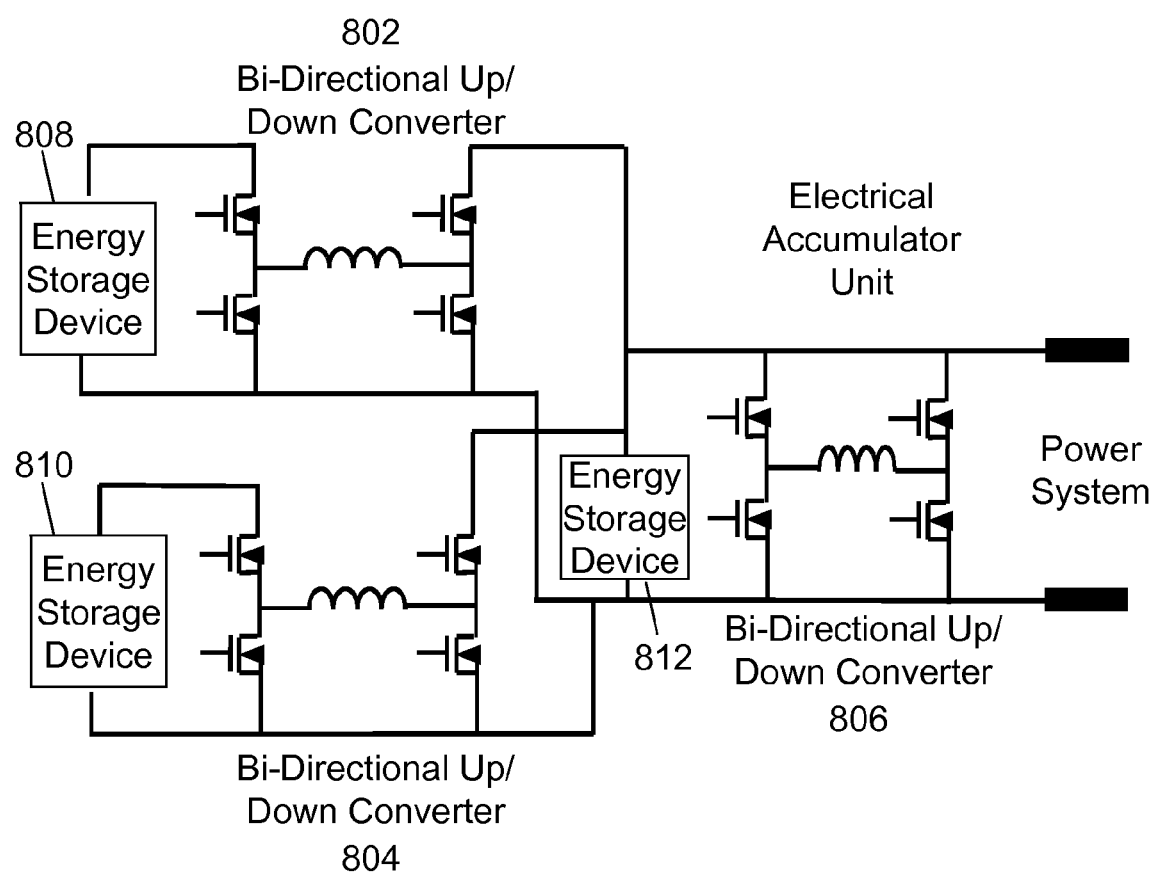
FIG. 8 is a schematic illustration of a mixed parallel connection and a series connection of a first energy storage device, a second energy storage device, and a third energy storage device within three bidirectional up/down converters.

With reference now to FIG. 8, a schematic illustration of a mixed parallel connection and series connection of a first energy storage device 808, a second energy storage device 810, and a third energy storage device 812 within bidirectional up/down converters 802, 804, and 806, respectively, to create an EAU is shown. As shown in FIG. 8, bidirectional up/down converters 802, 804, and 806 include a parallel connection of first energy storage device 808 and second energy storage device 810, and a series connection to third energy storage device 812. In embodiments, first energy storage device 808, second energy storage device 810, and third energy storage device 812 are one of the following, a battery, a capacitor, a super capacitor, a fly wheel, or combination thereof. Similar to the series connection shown in FIG. 6, if a voltage of third energy storage device 812 changes beyond a predetermined range, first energy storage device 808 and/or second energy storage device 810 supplies power to or removes power from third energy storage device 812. In addition, the parallel connection also shown in FIG. 8 provides a system wherein a sum of power ratings of bidirectional up/down converters 802, 804, and 808 equal a peak EAU power rating. Thus, a mixed parallel connection and series connection achieves the benefits of both the series connection of FIG. 6 and the parallel connection of FIG. 7.

An exemplary embodiment of an EAU for an aircraft power system is described above in detail. The EAU and aircraft power system components illustrated are not limited to the specific embodiments described herein, but rather, components of each aircraft power system may be utilized independently and separately from other components described herein.

Further, while the invention has been described in terms of various specific embodiments, those skilled in the art will recognize that the invention can be practiced with modification within the spirit and scope of the claims.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for transferring power in an aircraft between an energy storage device and a power system, the method comprising:
   determining an amount of power required by the power system;
   determining a predetermined power of a generator;
   comparing the power required by the power system to the predetermined power of the generator; and
   transferring power to the energy storage device from the power system or to the power system from the energy storage device based on the comparing.

2. A method in accordance with claim 1, wherein the energy storage device is a battery, a capacitor, a super capacitor, or a fly wheel.

3. A method in accordance with claim 1, wherein the power system is a 270 Vdc power system.

4. A method in accordance with claim 1, wherein power is transferred from the energy storage device to the power system if the predetermined power of the generator is less than the amount of power required by the power system.

5. A method in accordance with claim 1, wherein power is transferred from the power system to the energy storage device if the predetermined power of the generator is greater than the amount of power required by the power system.

6. A method in accordance with claim 1, further comprising:
   determining the predetermined power of the generator;
   comparing the power required by the power system to the predetermined power of the generator; and
   transferring power to a first energy storage device and/or a second energy storage device from the power system, or to the power system from the energy storage device and/or an additional energy storage device based on the comparing.

7. An aircraft power system configured to transfer power between one or more energy storage devices and a power system, the system comprising:
   a processor programmed to:
   determine an amount of power required by the power system;
   determine a predetermined power of a generator;
   compare the power required by the power system to the predetermined power of the generator; and
   transfer power to at least one of the one or more energy storage devices from the power system or to the power system from the at least one of the one or more energy storage devices based on the comparing.

8. A system in accordance with claim 7, wherein the energy storage device is a battery, a capacitor, a super capacitor, or a fly wheel.

9. A system in accordance with claim 7, wherein the power system is a 270 Vdc power system.

10. A system in accordance with claim 7, wherein power is transferred from the energy storage device to the power system if the predetermined power of the generator is less than the amount of power required by the power system.

11. A system in accordance with claim 7, wherein power is transferred from the power system to the energy storage device if the predetermined power of the generator is greater than the amount of power required by the power system.

12. A system in accordance with claim 7, wherein the processor is further programmed to:
   determine the predetermined power of the generator and;
   compare the power required by the power system to the predetermined power of the generator; and
   transfer power to the at least one of the one or more energy storage devices and/or an additional energy storage device of the one more energy storage devices from the power system, or to the power system from the energy storage device and/or the additional one of the one or more energy storage devices based on the comparing.

13. A system in accordance with claim 7, wherein the second energy storage device is a battery, a capacitor, a super capacitor, or a fly wheel.

14. An electric accumulator unit (EAU) configured to transfer power between one or more energy storage devices and a power system, the EAU comprising:
   the one or more energy storage devices; and
   a computing device comprising:
   a determining component for determining a power required by the power system and a power available from the one or more energy storage devices;
   a comparing component for comparing the power required by the power system to the power available from at least one of the one or more energy storage devices; and an energy transfer converter for transferring power to the at least one of the one or more energy storage devices from the power system or for transferring power to the power system from the at least one of the one or more energy storage devices based on the comparing.

15. An EAU in accordance with claim 14, wherein the one or more energy storage devices are one of or a combination of the following: a battery, a capacitor, a super capacitor, and a fly wheel.

16. An EAU in accordance with claim 14, wherein power is transferred from the at least one of the one or more energy storage devices to the power system if the computed predetermined generator power is less than the amount of power required by the power system.

17. An EAU in accordance with claim 14, wherein power is transferred from the power system to the at least one of the one or more energy storage devices if the computed predetermined generator power is greater than the amount of power required by the power system.

18. An EAU in accordance with claim 14, wherein the first energy storage device and the second energy storage device are connected in a series within two bidirectional up/down converters.

19. An EAU in accordance with claim 14, wherein the first energy storage device and the second energy storage device are connected in parallel within two bidirectional up/down converters.

20. An EAU in accordance with claim 19, further comprising a third energy storage device connected in a series with the first energy storage device and the second energy storage device within three bidirectional up/down converters.

* * * * *